United States Patent [19]
Griebling

[11] Patent Number: 5,300,180
[45] Date of Patent: Apr. 5, 1994

[54] MAGNETIC TIRE BEAD SETTER

[75] Inventor: Stephen T. Griebling, Akron, Ohio

[73] Assignee: Bridgestone/Firestone, Inc., Akron, Ohio

[21] Appl. No.: 75,194

[22] Filed: Jun. 10, 1993

[51] Int. Cl.⁵ .......................................... B29D 30/32
[52] U.S. Cl. ..................................... 156/403; 156/131
[58] Field of Search ............ 156/403, 131, 398, 406.2, 156/126, 135, 421.8

[56] References Cited

U.S. PATENT DOCUMENTS

| | | | |
|---|---|---|---|
| 3,839,115 | 10/1974 | Leblond et al. | 156/131 |
| 4,120,714 | 10/1978 | Colombani et al. | 156/403 X |
| 4,148,680 | 4/1979 | Harding | 156/403 |
| 4,190,482 | 2/1980 | Yabe | 156/403 |
| 4,226,656 | 10/1980 | Appleby et al. | 156/132 |
| 4,239,579 | 12/1980 | Felten et al. | 156/398 |
| 4,264,387 | 4/1981 | Allitt | 156/131 |
| 4,293,358 | 10/1981 | Loeffler et al. | 156/403 X |
| 4,498,948 | 2/1985 | Brown et al. | 156/401 |
| 4,830,693 | 5/1989 | Okafuji et al. | 156/132 |
| 4,964,931 | 10/1990 | Ring | 156/131 |
| 5,073,225 | 12/1991 | Schmitt et al. | 156/401 |
| 5,141,588 | 8/1992 | VanBuskirk | 156/401 |

Primary Examiner—Geoffrey L. Knable
Attorney, Agent, or Firm—David A. Thomas

[57] ABSTRACT

An improved bead setter for mounting on a retractable bead setter carrier ring of a tire building drum for carrying a steel tire bead from a load position to a pickup position on the drum where the bead is coaxial and radially aligned with radially expanding bead locks. The bead setter has a holder which is secured to the ring and has a finger which is slidably pivotally mounted in a cutout formed in the holder. A spring biases the finger to an at-rest outwardly extending bead gripping position. One or more permanent magnets are mounted on an extended end of the finger for gripping a bead. The finger is displaced radially as the bead lock extends radially outwardly to engage the bead and then pivots in a generally axial outward direction as the bead carrier ring axially withdraws to a retracted position, enabling the finger to pass freely over tire plies previously applied on the drum. The spring automatically returns the finger to the outwardly extending position, providing a smaller diameter between fingers for subsequent pickup of another bead at the bead load position.

16 Claims, 6 Drawing Sheets

MAGNETIC TIRE BEAD SETTER

BACKGROUND OF THE INVENTION

1. Technical Field

The invention relates to tire building equipment and in particular to the tire building drum and to the bead setter associated therewith. More particularly, the invention relates to an improved magnetic tire bead setter, a plurality of which are mounted on a bead setter ring which is attached to the bladder push cone of the tire building drum for transporting a tire bead from a load station to a position which is coaxial and radially aligned with the bead locks of the tire building drum.

2. Background Information

In the building of pneumatic tires, various sheets or strip components thereof are laid and placed around a cylindrical drum to build-up the carcass. One of the steps in the tire manufacturing process is the telescopic mounting of a bead ring over the drum around the ends of the tire carcass, which ends are subsequently turned up by an inflatable bladder for forming the usual toroidal shape of the final tire. Prior to the inflation of the turn-up bladders, a plurality of circularly arranged bead lock segments which are mounted on the drum, are expanded radially outwardly by pressurized air, mechanical linkage or other mechanism for positioning the bead ring with respect to the tire carcass.

It is necessary that the bead ring be accurately placed with respect to the bead lock segments to ensure proper positioning of the bead with respect to the tire carcass. Various types of mechanisms, commonly referred to as bead setters, are used with tire building drums for automatically moving a tire bead from a load position axially along the tire building drum to the proper radially aligned position with the bead lock segments. Many of these bead setters include fixed magnets mounted on a bead carrier ring, which in turn is mounted on or formed as a part of the push ring cone of the tire building equipment.

Prior art examples of bead setters having both magnetic and non-magnetic carriers thereon are shown in the following patents.

U.S. Pat. No. 3,839,115 shows a bead setter which includes electromagnetic pole members which hold a bead during the setting operation and a supporting carriage which retracts when the bead is placed on the drum.

U.S. Pat. No. 4,190,482 shows a tire building apparatus having bead setting means which includes magnets that hold the bead rings until they have been placed, afterwhich the holder segments are moved radially outwardly.

U.S. Pat. No. 4,264,387 shows a bead setting device which has magnets with movable segments. However, the segments are not pivotally and slidably mounted on a carrier as the present invention.

U.S. Pat. No. 4,964,931 discloses a bead setter having a frame with a plurality of magnetic segments mounted thereon. Again, the magnetic segments are not pivotally slidably mounted as in the present invention.

U.S. Pat. No. 5,073,225 shows a bead setter having both permanent and electromagnets carried thereon for carrying the bead ring to an install position.

Although many of these prior art bead setters, both magnetic and non-magnetic, perform satisfactorily for their intended purpose, the use of magnetic bead setters is desirable for many applications due to their simplicity. However, certain fixed magnetic bead setters create problems when delivering certain types of tire beads, and in particular beads that have a hexagonal cross section. It is difficult to securely grip these hexagonal beads and orient them in the proper position, yet enable the magnetic carrier ring to have a sufficiently large inner diameter which will clear the diameter developed when the carcass plies, which have been applied over the drum, are expanded outwardly by the bead locks. This outward expansion of the plies is necessary to grip the bead ring, afterwhich the bead setter carrier ring must move axially to a retracted position prior to inflation of the bead turnup bladder.

Thus, the need exists for an improved magnetic bead setter which is able to magnetically grasp and securely support a bead ring thereon even when the bead has different cross-sectional configurations, and accurately position the ring in an outwardly radially aligned position with respect to the expandable bead locks of a tire building drum, and most importantly be able to move axially to a retracted position and clear the carcass ply material previously placed on the drum, after the ply material has been moved radially outwardly by the bead locks.

SUMMARY OF THE INVENTION

Objectives of the invention include providing an improved magnetic bead setter for use with a tire building drum of the type having radially outwardly expanding bead locks, for securely gripping and moving a tire bead to a position aligned with the bead locks, wherein the bead setter is able to move axially to a retracted position for subsequent reloading, and clear the diameter developed when the tire plies have been expanded outwardly by the bead locks into gripping engagement with the bead lock.

A further objective of the invention is to provide an inexpensive bead setter which will permit full bead lock clamping without sacrificing bead setting accuracy and without effecting withdrawal of the bead lock or causing damage to the tire plies previously applied to the tire building drum.

Another objective of the invention is to provide such an improved magnetic bead setter which is of a low cost and of a simple construction, and which will not compromise the bead holding force supplied by the magnets, and which will hold steel beads of various cross-sectional configurations.

Another objective of the invention is to provide such a magnetic bead setter which is adaptable for use with existing bead setting rings, which rings are formed as a permanent part of or attached to the bladder pusher cone of a usual tire building drum, thereby avoiding expensive modifications to existing tire building equipment, and which will enable a plurality of the magnetic bead setters to be spaced around the bead setter ring and contain one or more permanent magnets to provide the necessary magnetic gripping force, in a simple, inexpensive, and durable structure.

These objectives and advantages are obtained by the improved bead setter ring for mounting on a bladder push cone of a tire building drum, the general nature of which may be stated as including a ring having a plurality of bead setters mounted in a spaced circular arrangement on the ring; wherein each of the setters includes a holder secured to the carrier ring, a finger having a magnetized area thereon for releasably gripping a bead, and means for slidably pivotally mounting the finger on the holder whereby the finger is free to move in a generally radially outward direction upon radial outward movement of the bead locks of a tire building drum to grip the bead and then automatically pivot in a generally axially outward direction upon axial movement of the carrier ring back to a bead load position.

BRIEF DESCRIPTION OF THE DRAWINGS

A preferred embodiment of the invention, illustrative of the best mode in which applicant has contemplated applying the principles, is set forth in the following description and is shown in the drawings and is particularly and distinctly pointed out and set forth in the appended claims.

Similar numerals refer to similar parts throughout the drawings.

DESCRIPTION OF THE PREFERRED EMBODIMENT

Figure 1:
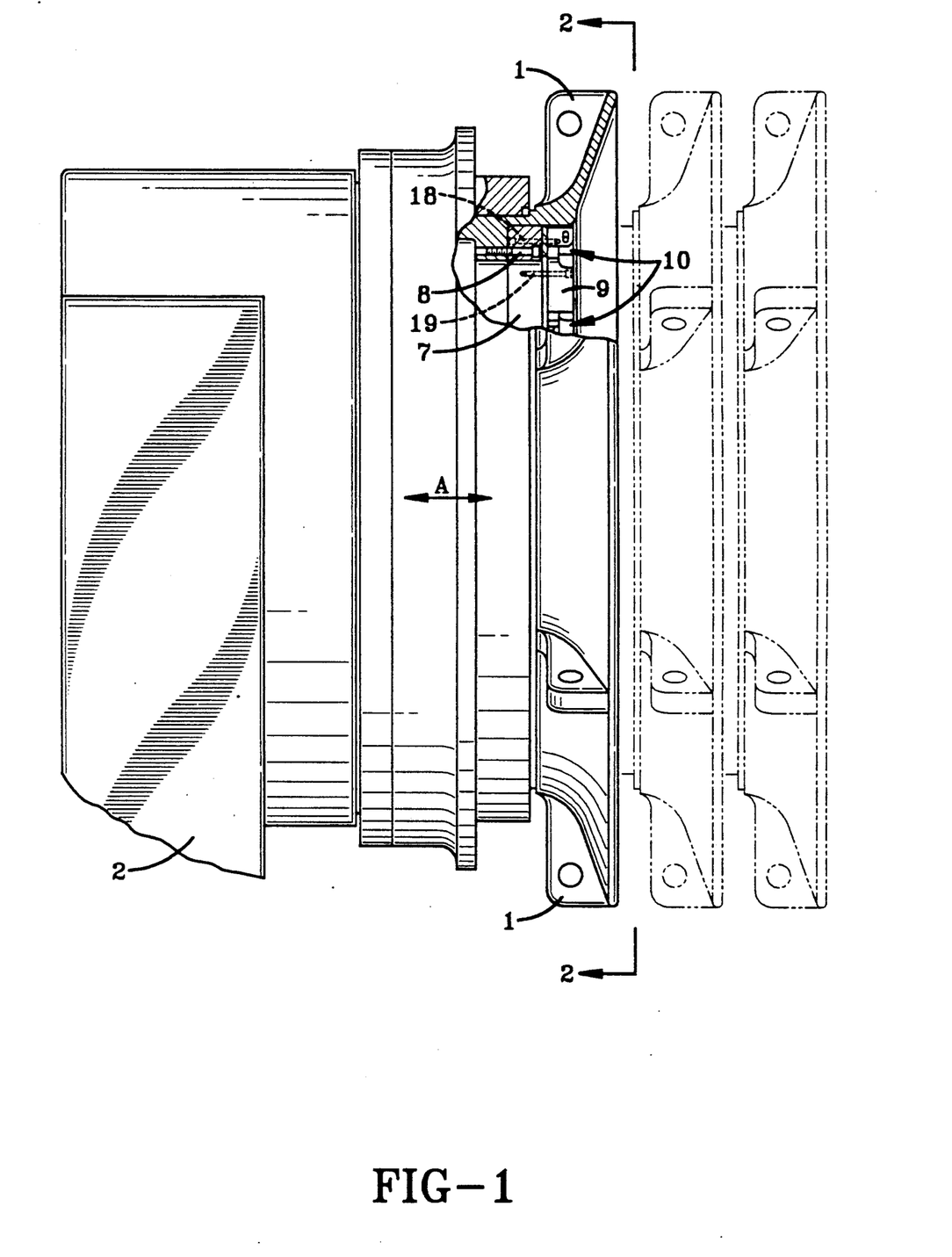
FIG. 1 is a fragmentary side elevation view showing a bladder push cone of a tire building drum, with portions broken away in section, on which are mounted a plurality of the improved retractable magnetic bead setters, with two extended positions of the cone shown in dot-dash lines.
Figure 2:
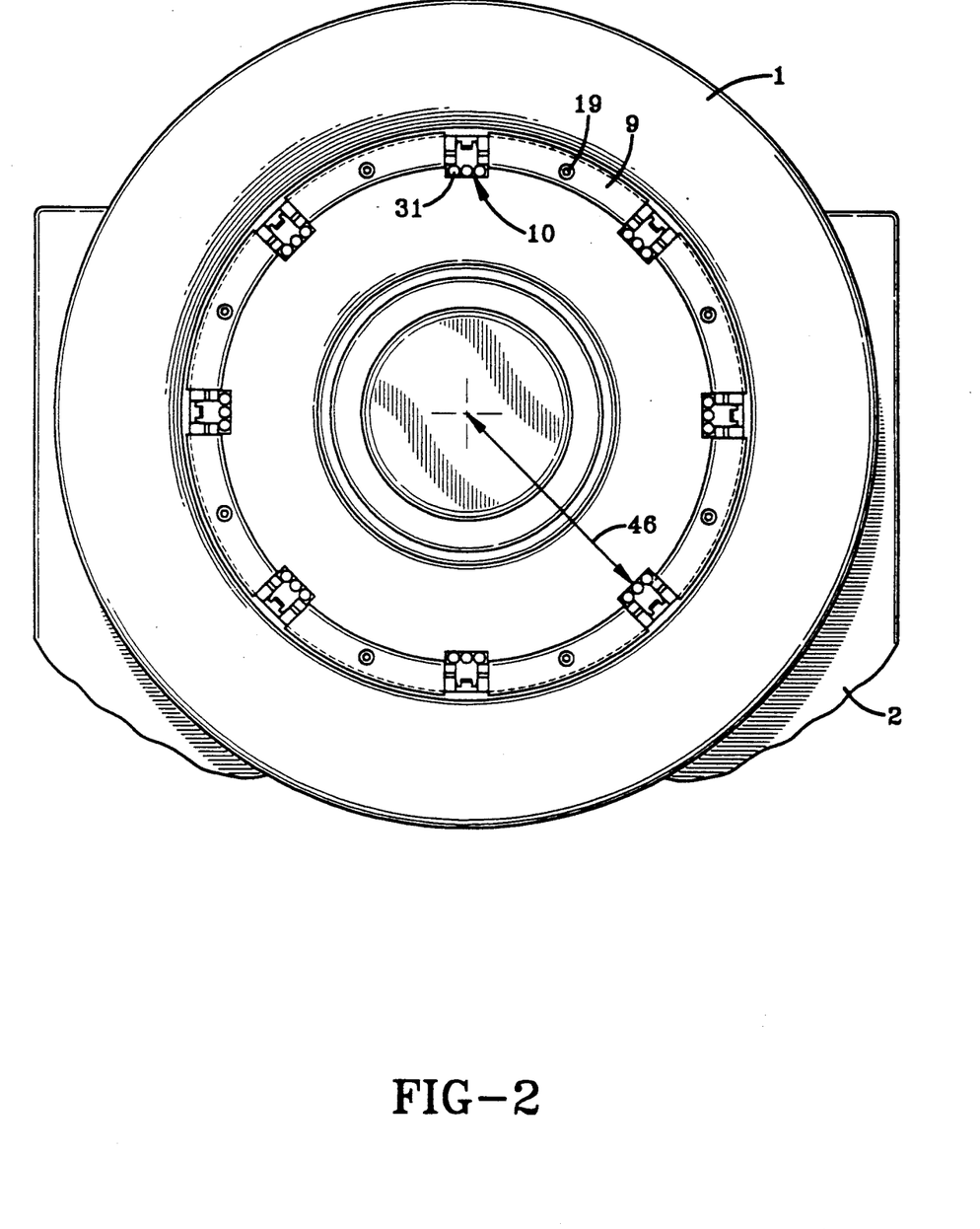
FIG. 2 is a fragmentary front elevational view looking in the direction of arrows 2—2, FIG. 1.

FIGS. 1 and 2 show a usual bladder push cone 1 which is movably mounted on a usual tire building machine, only a portion 2 of which is shown in the drawings. Push cone 1 is coaxially mounted for movement in the axial direction, indicated by arrow A, about a usual tire building drum (not shown) for moving a tire bead 3 (FIGS. 8-10) into radial alignment with a plurality of retractable bead lock segments 4. Bead locks 4 are expanded radially outwardly by various well known mechanism for positioning the bead ring for pressing engagement with the various plies 5 of a tire carcass, which plies have been previously laid upon tire drum 2 and extend over a portion of an inflatable bead turnup bladder 6, such as shown in U.S. Pat. No. 5,141,588.

As shown in FIG. 1, a usual bead setter ring 7 is mounted by a plurality of bolts 8 or other attachment means onto push cone 1. Various prior art bead setter rings have permanent magnets firmly attached to the front surface of ring 7 for grasping and carrying a bead from a load position, such as shown in full lines in FIG. 1, to a position aligned with the bead locks as shown in the outermost dot-dash position.

Figure 3:
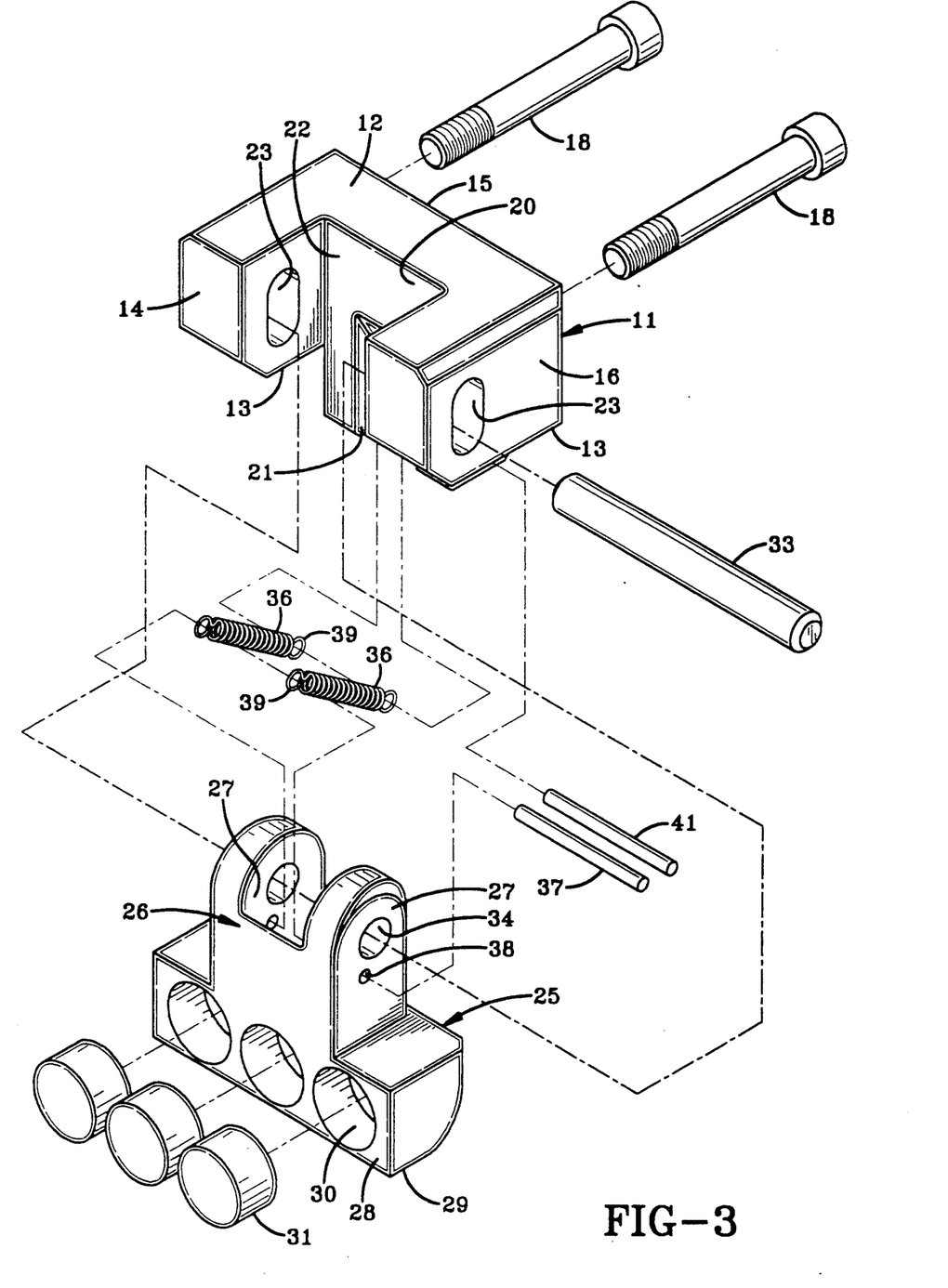
FIG. 3 is an enlarged exploded perspective view of one of the magnetic bead setters removed from the pusher cone of FIGS. 1 and 2.
Figure 4:
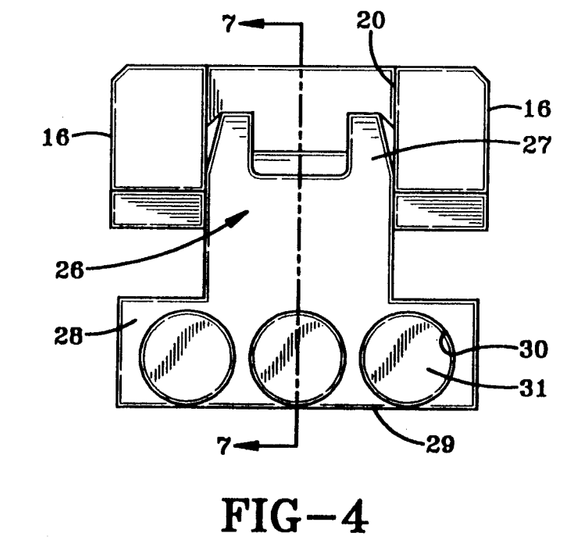
FIG. 4 is a front elevational view of the bead setter of FIG. 3 in assembled position.
Figure 5:
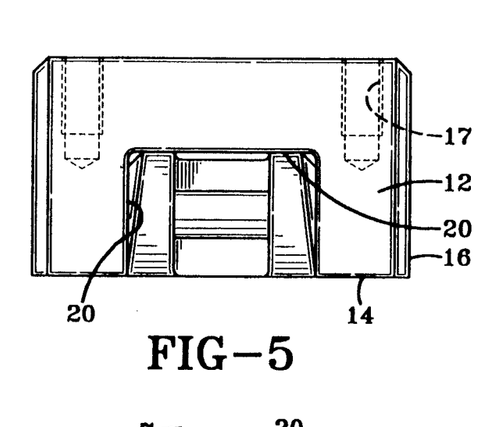
FIG. 5 is a top plan view of the assembled bead setter of FIG. 4.
Figure 6:
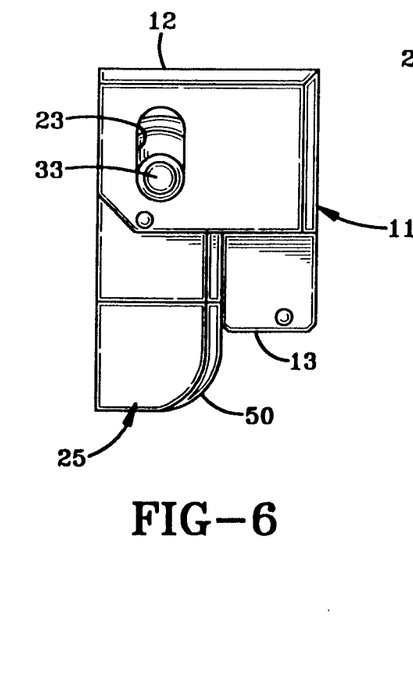
FIG. 6 is a right-hand side elevational view of the assembled bead setter of FIGS. 4 and 5.

In accordance with the invention, a plurality of the improved bead setters which are indicated generally at 10, are shown mounted in a circular equally spaced arrangement on bead setter ring 7 by pairs of bolts 18, and are separated by arcuate spacers 9, which are mounted on ring 7 by bolts 19. Referring particularly to FIGS. 3-7, bead setter 10 includes a main body or holder indicated generally at 11, which has a generally rectangular block-shaped configuration, with spaced parallel top and bottom surfaces 12 and 13, spaced parallel front and rear faces 14 and 15, and a pair of spaced parallel end surfaces 16. A pair of threaded holes 17 are formed in the rear of body 11 into which attachment bolts 18 extend for mounting holder 11 onto setter ring 7 (FIGS. 1 and 3)

Figure 7:
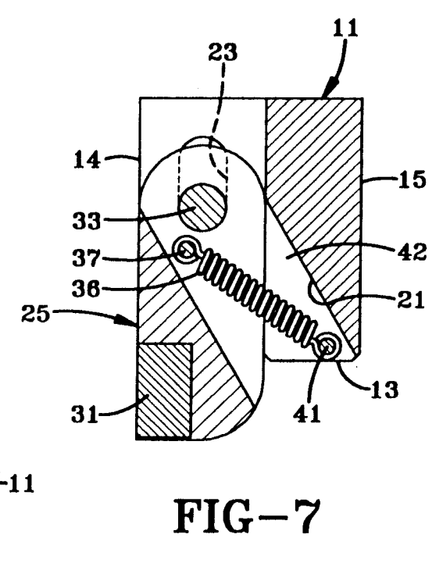
FIG. 7 is a sectional view taken on line 7—7, FIG. 4.

An enlarged central cutout 20 is formed in front face 14 and has a generally rectangular configuration, with a smaller angled cutout 21 being formed in the center of the rear surface 22 of cutout 20 (FIG. 7). A pair of generally oval-shaped slots 23 are formed in holder 11 and communicate with notch 20 for pivotally slidably mounting a finger, indicated generally at 25, therein.

Finger 25 preferably is formed of aluminum as is holder 11, and includes a general stem portion 26 formed by a pair of parallel spaced stems 27 which terminate in a base 28, which extends generally orthogonal to the direction of stems 27. Base 28 is formed with a plurality of circular cutouts or pockets 30, into which permanent magnets 31 are secured by an epoxy or other attachment means. The polarity of the magnets alternate, for example, S-N-S or N-S-N.

In accordance with one of the main features of the invention, finger 25 is pivotally slidably mounted within cutout 20 of holder 11 by a pivot pin 33. Pin 33 extends through aligned slots 23 and through complementary shaped holes 34 formed in finger stems 27 to pivotally mount finger 25 within cutout 20. The mounting of pivot pin 33 in oval shaped slots 23 also provides for radial movement of the pin and finger with respect to holder 11, as best shown in FIGS. 8-10.

Figure 8:
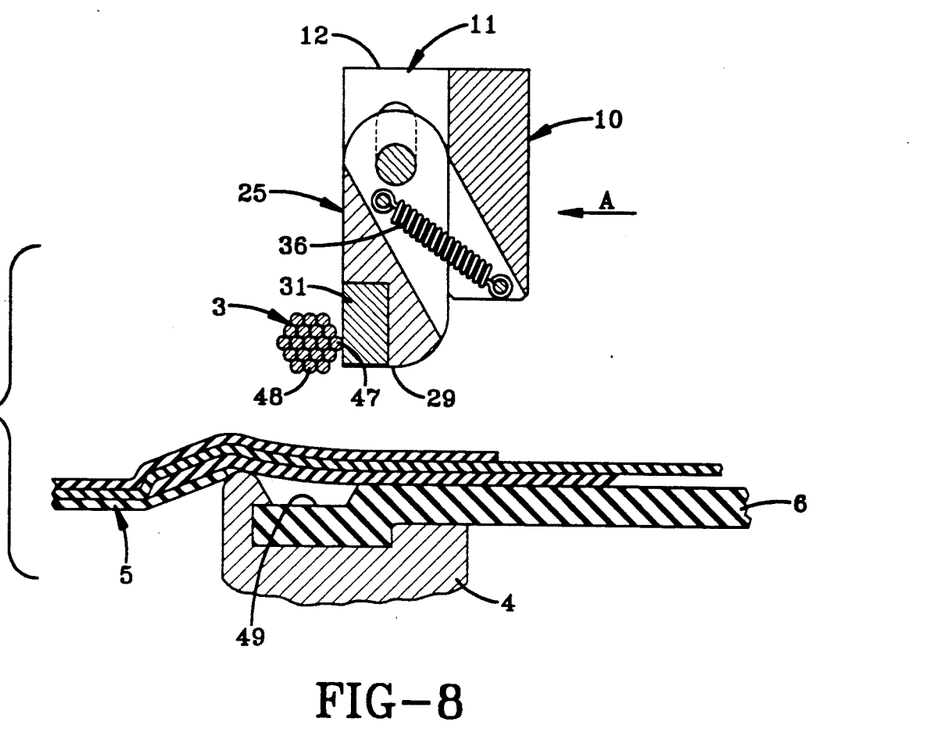
FIGS. 8, 9 and 10 are generally diagrammatic sectional views showing the movement of the magnetic bead setter in cooperation with a turn-up bladder and bead lock, shown in section.

Finger 25 is spring biased into an at-rest, extended position as shown in FIGS. 7 and 8 by a pair of tension coil springs 36. One end 39 of each spring 36 is connected to finger 25 by a pin 37 which is press fitted into a pair of aligned holes 38 which are formed in each stem 27, and extends through looped ends 39 of the springs. A second pin 41 (FIG. 3) is press fitted into complementary shaped holes formed in the spaced parallel inner surfaces 42, which surfaces define the sides of angled cutout 21. Pin 41 extends through opposite looped ends 39 of springs 36 as does pin 37.

Springs 36 bias finger 25 to an at-rest position as shown in FIGS. 7 and 8 wherein the end of the finger at which magnets 31 are mounted, extends to a position beyond bottom surface 13 of holder 11. In this position, pivot pin 33 will be resting against the bottom portion of oval shaped slots 23. Thus, when in this at-rest position of FIGS. 7 and 8, the radius to the axial centerline 45 of the tire building drum, as well as to the centerline of bladder push cone 1 and setter ring 7 (FIG. 2), will have a radius distance indicated at 46. The advantage of which is discussed more fully below.

Figure 9:
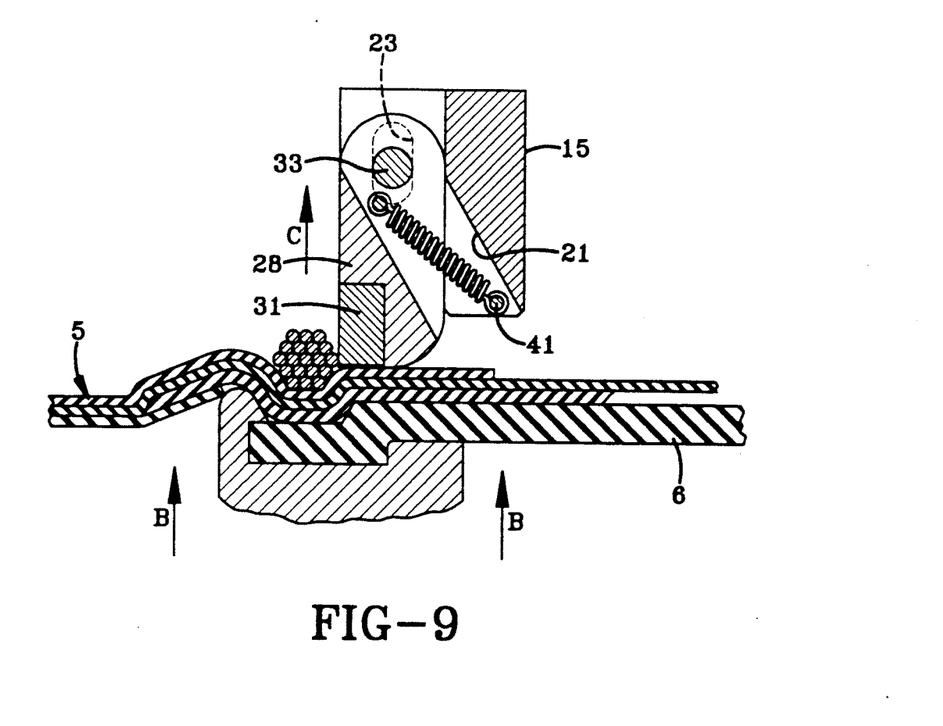
Figure 10:
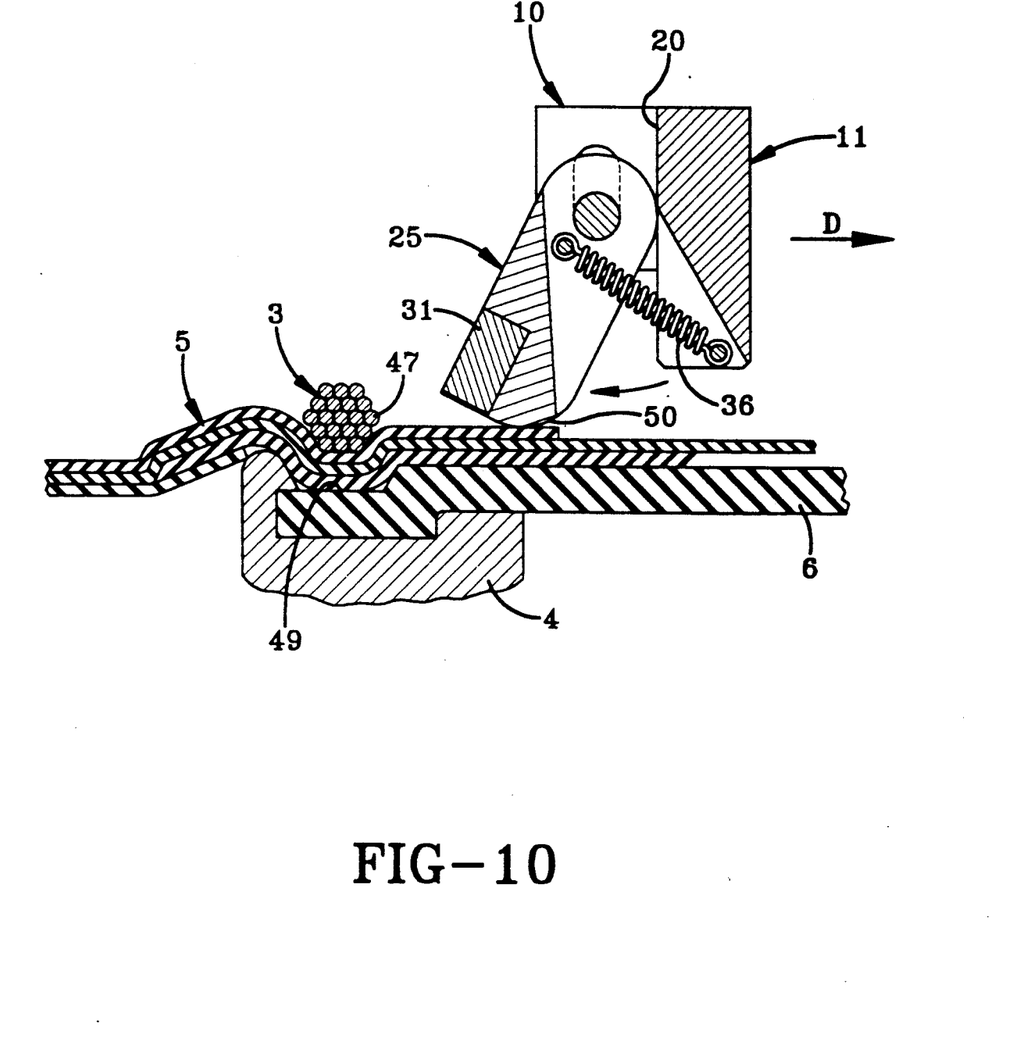

The operation and advantages of improved bead setter 10 is best illustrated in FIGS. 8-10. FIG. 8 shows the position of one of the bead setters 10 after it has been moved axially in the direction of arrow A to a position radially aligned with a bead lock 4. Bead 3 is shown as having a hexagonal cross sectional configuration, wherein the outermost wires 47 lie approximately at the midpoint of the bead section radius. This hexagonal configuration has been found to provide increased breaking strength with less wire then many other types of bead configurations. However, this configuration is difficult to be correctly oriented and securely grasped and carried to the correct position above the bead locks by the heretofore fixed magnetic bead setters, since the fixed magnets must have a greater radius to the centerline of the setter ring than that of radius 46 as shown in FIG. 2, in order to be able to retract after the body plies have been expanded outwardly as shown in FIG. 10. Outermost wire 47 of the bead ring preferably is gripped by magnets 31 so that the bottommost coils 48 are in proper alignment with bead locks 4. The various tire carcass body plies 5 will have been previously laid along the tire building drum and over a portion of bladder 6.

Upon bead 3 reaching the proper radially aligned position with bead locks 4, the appropriate tire building drum mechanism will be actuated expanding locks 4 radially outwardly in the direction of arrows B, FIG. 9, causing bead 3 to be pressed into a bead lock groove 49 forcing with it the adjacent portions of plies 5. This radially outward movement of bead locks 4 will caress bottom surface 29 of the finger to contact the raised body plies causing finger 25 to move outwardly in the direction of arrow C. This radial outward movement is possible due to the ability of pivot pin 33 to move radially in oval-shaped slots 23.

Thus, the smaller diametric spacing between the innermost ends of fingers 25 as shown in FIG. 2, and the location of magnets 31, enable a firm magnetic grip to be achieved with bead 3 to enable it to be accurately placed in radial alignment with bead lock grooves 49, and to retain ring 3 in this position until it is firmly seated in grooves 49 of bead locks 4, by the automatic radial sliding movement of finger 25 within cutout 20, due to its sliding mounting in slots 23.

After bead 3 is firmly secured in bead lock grooves 49, bead setter ring 7 then is axially retracted in the direction of arrow D (FIG. 10) prior to the inflation of bladder 6. Heretofore, this presented problems due to the increased diameter of tire carcass plies 5 caused by the radially outwardly expansion of bead locks 4. However, with the improved construction of bead setter 10, fingers 25 are able to pivot axially outwardly as shown in FIG. 10, from their radially downwardly extending position of FIGS. 8 and 9, due to the pivotal mounting of each of the fingers within holder cutout 20. This enables each of the fingers, and in particular the rounded rear corner 50 thereof, to slide easily over tire carcass body plies 5 until it reaches the bead load position for grasping another bead 3. At this position, springs 36 will automatically return finger 25 to its at-rest extended position as shown in FIGS. 7 and 8 for pickup of the next bead.

Therefore, the slidable pivotal mounting arrangement of finger 25 within holder cutout 20, enables the finger to be initially extended radially inwardly the necessary distance, for firmly grasping a bead for movement thereof to its aligned position above the retracted bead locks, and will maintain firm magnetic contact with the bead until the finger is forcibly moved out of engagement therewith by the expanding carcass body. Afterwhich the bead setters can axially retract to the bead pickup position even though the body plies are in an outwardly expanded condition, due to the now larger diameter between the finger ends. This spring biased mounting arrangement avoids damage to the fingers and/or body ply since the fingers merely pivot outwardly and slide gently over the ply surface when the bead setter ring returns to its retracted position. Also, immediately upon the fingers passing beyond the body plies, they will automatically be extended outwardly by springs 36 to form the smaller inner diameter as shown in FIG. 2 for grasping another bead 3.

Accordingly, the improved magnetic tire bead setter is simplified, provides an effective, safe, inexpensive, and efficient device which achieves all the enumerated objectives, provides for eliminating difficulties encountered with prior devices, and solves problems and obtains new results in the art.

In the foregoing description, certain terms have been used for brevity, clearness and understanding; but no unnecessary limitations are to be implied therefrom beyond the requirement of the prior art, because such terms are used for descriptive purposes and are intended to be broadly construed.

Moreover, the description and illustration of the invention is by way of example, and the scope of the invention is not limited to the exact details shown or described.

Having now described the features, discoveries and principles of the invention, the manner in which the improved magnetic tire bead setter is constructed and used, the characteristics of the construction, and the advantageous, new and useful results obtained; the new and useful structures, devices, elements, arrangements, parts and combinations, are set forth in the appended claims.

I claim:

1. The combination of a tire building drum and an axially movable bead carrier ring, said drum having a plurality of radially movable bead locks circularly arranged coaxially of the drum for gripping and removing a bead for a tire carcass from the bead carrier ring, said bead carrier ring having a plurality of an improved bead setter mounted in a circular arrangement thereon, each of said bead setters including:
   a) a holder rigidly secured to the carrier ring;
   b) a finger having at least one magnet thereon for releasably gripping the bead; and
   c) means for slidably pivotally mounting the finger on the holder whereby said finger is free to move in a generally radially outward direction upon radial outward movement of the bead locks when gripping the bead and then pivot in a generally outward axial direction upon axial movement of the carrier ring back to a bead load position.

2. The combination defined in claim 1 including spring means for biasing the finger towards an at-rest bead gripping position wherein the distance between the fingers of two diametrically opposed bead setters is at a minimum.

3. The combination defined in claim 2 in which the spring means is a tension coil spring connected at one end to the holder and at an opposite end to the finger.

4. The combination defined in claim 1 in which the holder is formed with a radially extending cutout and a pair of elongated slots on opposite sides of said cutout; and in which a pivot pin extends between said slots and through the cutout to pivotally slidably mount said finger within the cutout.

5. The combination defined in claim 4 in which the finger is formed with an opening; in which an attachment pin extends into said opening; and in which one end of a coil spring is connected to the attachment pin at said opening, with an opposite end of the spring being connected to the holder for biasing the finger to an extended position with respect to the holder.

6. The combination defined in claim 5 in which the finger includes a stem and a base; in which pockets are formed in the base; and in which a magnet is mounted in each of the pockets.

7. The combination defined in claim 6 in which the polarity of the magnets alternate along the base.

8. The combination defined in claim 6 in which each of the magnets is a disc-shaped permanent magnet.

9. The combination defined in claim 4 in which the holder cutout is formed in a front face of the holder; in which the finger is generally T-shaped having a stem, and a base which extends orthogonal to the stem; and in which the stem lies in the cutout and the base extends along a bottom adjacent face of said holder.

10. The combination defined in claim 9 in which the magnet is mounted on the base of the finger adjacent an outer end thereof.

11. The combination defined in claim 1 in which the holder and finger are formed of aluminum.

12. The combination defined in claim 1 in which the bead setters are adapted to grip a bead formed of a plurality of steel wires, hexagonal in cross section, with outermost wires of the bead lying approximately at the midpoint of the bead section radius.

13. A bead setter ring for mounting on a tire building drum; said ring having a plurality of individual bead setters mounted in a spaced circular arrangement on said ring, each of said setters including a holder secured to the setter ring; a finger having a magnetized area thereon for releasably gripping a metallic bead; and means for slidably pivotally mounting the finger on the holder whereby said finger is free to move in a generally radially outward direction upon radial outward movement of bead locks of a tire building drum to grip the bead, and then pivot in a generally axial direction upon axial movement of the setter ring toward a bead load position.

14. The bead setter ring defined in claim 13 including spring means for biasing each of the fingers towards an at-rest outwardly extending bead gripping position.

15. The bead setter ring defined in claim 14 in which the spring means is a tension coil spring connected at one end to the holder and at an opposite end to the finger.

16. The bead setter ring defined in claim 13 in which the holder is formed with a radially extending cutout and a pair of elongated slots on opposite sides of said cutout; in which a pivot pin extends between said slots and through the finger to pivotally slidably mount said finger within the cutout; in which the finger is formed with an opening and an attachment pin extends through said opening; and in which one end of a coil spring is connected to the attachment pin at said opening with an opposite end of the spring being connected to the holder for biasing the finger to the outwardly extending position within the cutout of the holder.

* * * * *